(No Model.)
J. C. FORBIS.
HARROW TOOTH.
No. 329,035. Patented Oct. 27, 1885.
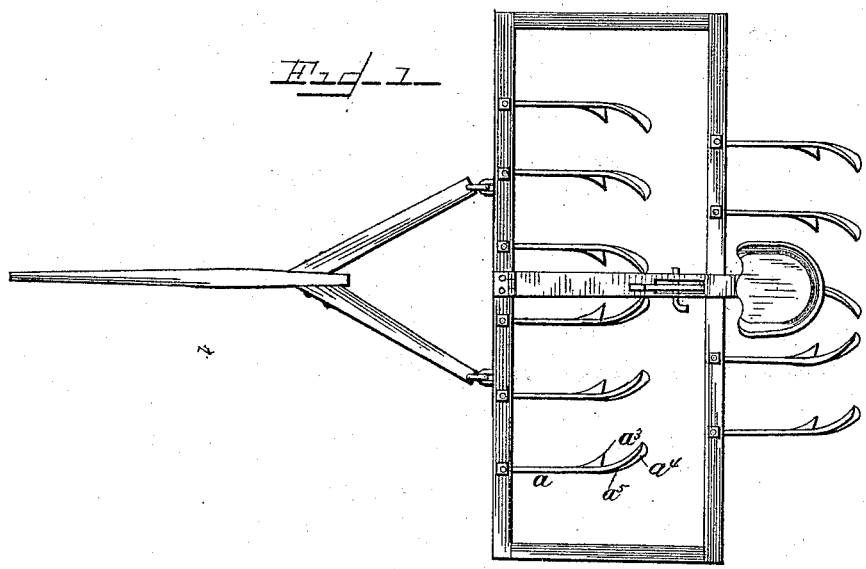
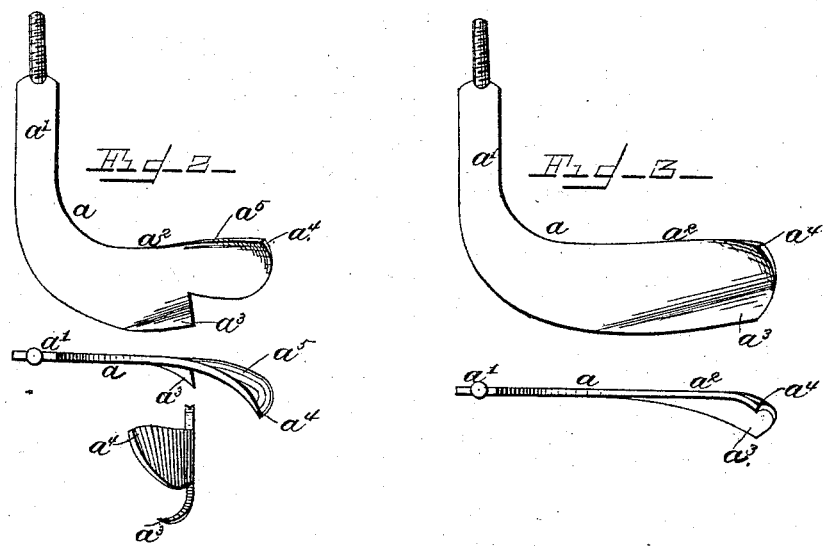
WITNESSES
R. W. Bishop.
G. P. Kramer.
INVENTOR
John C. Forbis
By R. S. & A. B. Lacey
Attorneys.

UNITED STATES PATENT OFFICE.

JOHN C. FORBIS, OF ASHLAND, MISSOURI.

HARROW-TOOTH.

SPECIFICATION forming part of Letters Patent No. 329,035, dated October 27, 1885.

Application filed August 24, 1885. Serial No. 175,147. (No model.)

*To all whom it may concern:*

Be it known that I, JOHN C. FORBIS, a citizen of the United States, residing at Ashland, in the county of Boone and State of Missouri, have invented certain new and useful Improvements in Harrow-Teeth; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has for its object to furnish an improved tooth for harrows or cultivators.

It consists in the construction hereinafter described, and specifically pointed out in the claims.

In the drawings, Figure 1 shows a harrow or cultivator frame having a number of my improved teeth arranged thereon. Fig. 2 shows three detail views of my improved tooth, and Fig. 3 shows a side elevation and a plan of a tooth slightly modified in form.

I have shown in Fig. 1 the improved teeth arranged on a frame, which may be of any suitable form and provided with draft attachments, as shown.

My improved tooth $a$ has its forward end bent upward, approximately to a vertical line, to form a standard or shank, $a'$, by which it may be attached to the frame of the harrow or cultivator. The rear wing, $a^2$, is in approximately the same vertical plane with the standard $a'$.

It is not necessary that the rear wing should be in the exact vertical plane with the forward end of the standard; but I prefer to make it this way.

The lower rear portion, $a^3$, of the rear wing is bent laterally, so as to form a cutter, the edge of which lies in nearly a horizontal plane, having just sufficient pitch downward to make it hold firmly in the earth. This lateral cutter is widest at its rear end and tapers to a point, where it joins the rear vertical under edge of the wing $a^3$. I prefer to give it a curved form, so that it will lift the earth slightly.

The upper rear corner, $a^4$, is curved or bent laterally to form a lip, which extends in the same lateral direction as the lower bent portion, $a^3$. The lower bent portion, $a^3$, cuts under and slightly lifts the earth, and the lip $a^4$ pushes it to one side, so that a narrow open cut or furrow is formed, which permits the air to freely circulate.

I have shown two arrangements of the bent portions $a^3$ $a^4$. Fig. 2 shows the lip $a^4$ on the end of an extension, $a^5$, of the tooth, which throws the said lip in rear of the bent portion $a^3$. Fig. 3 shows the lip $a^4$ immediately above the portion $a^3$. I make the tooth in both ways; but I prefer that form shown in Fig. 2, from which I secure better results.

The extension $a^5$ is projected from the upper portion of the rear end of the tooth and in line with the rear wing, $a^2$. The under edge of the extension is made sharp, and is on a horizontal line above the plane of the under edge of the wing $a^2$. This construction and arrangement throws the lip $a^4$ to the rear of the portion $a^3$. The wing serves as a rudder or steadier to the movement of the tooth, and gives thereby superior advantages over the construction shown in Fig. 3.

The teeth may be mounted on any suitable frame. The under edge of each tooth is made sharp, so that it will cut readily into the earth.

Having thus described my invention, what I claim, and desire to secure by Letters Patent, is—

1. A harrow-tooth having its forward end bent upward, and provided with means for securing it to a beam, its rearwardly-extended wing being arranged in an approximately-horizontal position, the lower rear end of said wing being bent laterally, and its upper rear corner curved to form a lip, which extends in the same lateral direction as the lower bent portion of the wing, substantially as and for the purposes set forth.

2. A harrow-tooth having its forward end bent upward, and provided with means for attaching it to the harrow-frame, its rearwardly-extended wing being arranged with its under edge in an approximately-horizontal position, the lower rear edge of said wing being bent laterally, and having an extension from the upper portion of the rear end, the said extension being provided on its upper
5 corner with a curved lip bent over in the same direction as the lower bent portion on the under edge of the rear wing, substantially as and for the purposes set forth.

In testimony whereof I affix my signature in presence of two witnesses.

JOHN C. FORBIS.

Witnesses:
 ELI PENTER,
 J. W. HAYDON.